Feb. 18, 1947.    M. WATTER ET AL    2,416,245
AIRCRAFT FUSELAGE AND WING CONSTRUCTION
Filed June 28, 1943    14 Sheets-Sheet 3
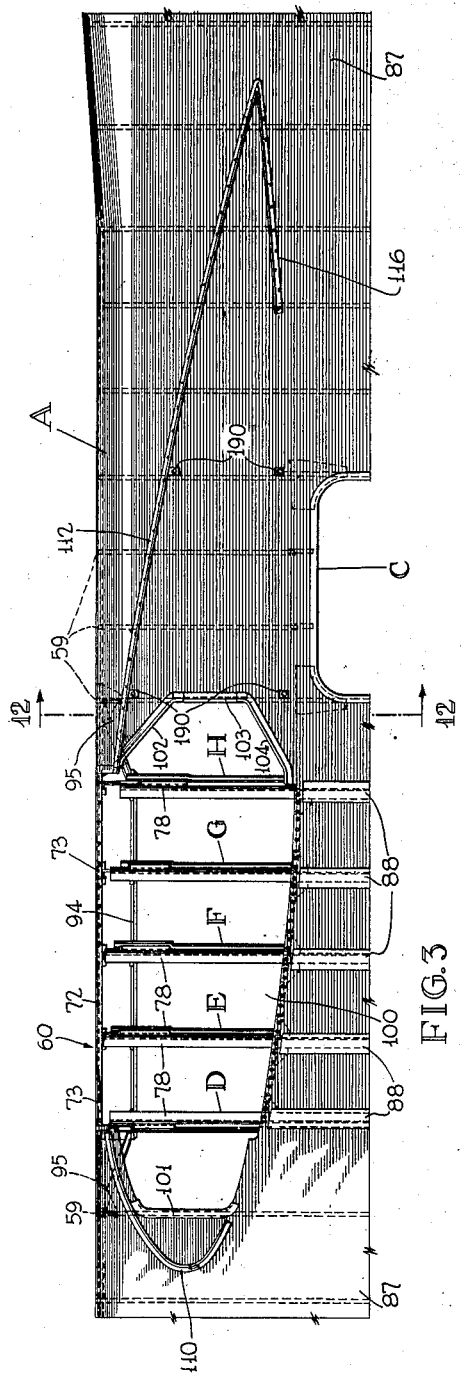
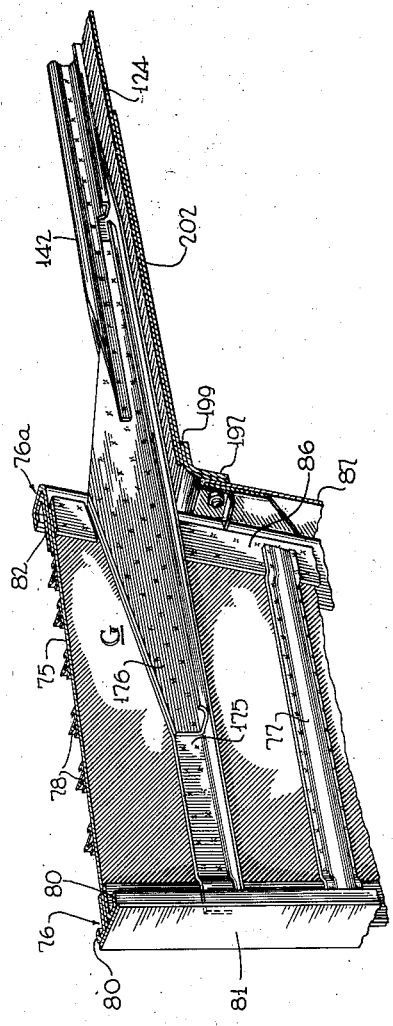
INVENTORS
Michael Watter.
Albert G. Dean.
BY John P. Tarbox
ATTORNEY

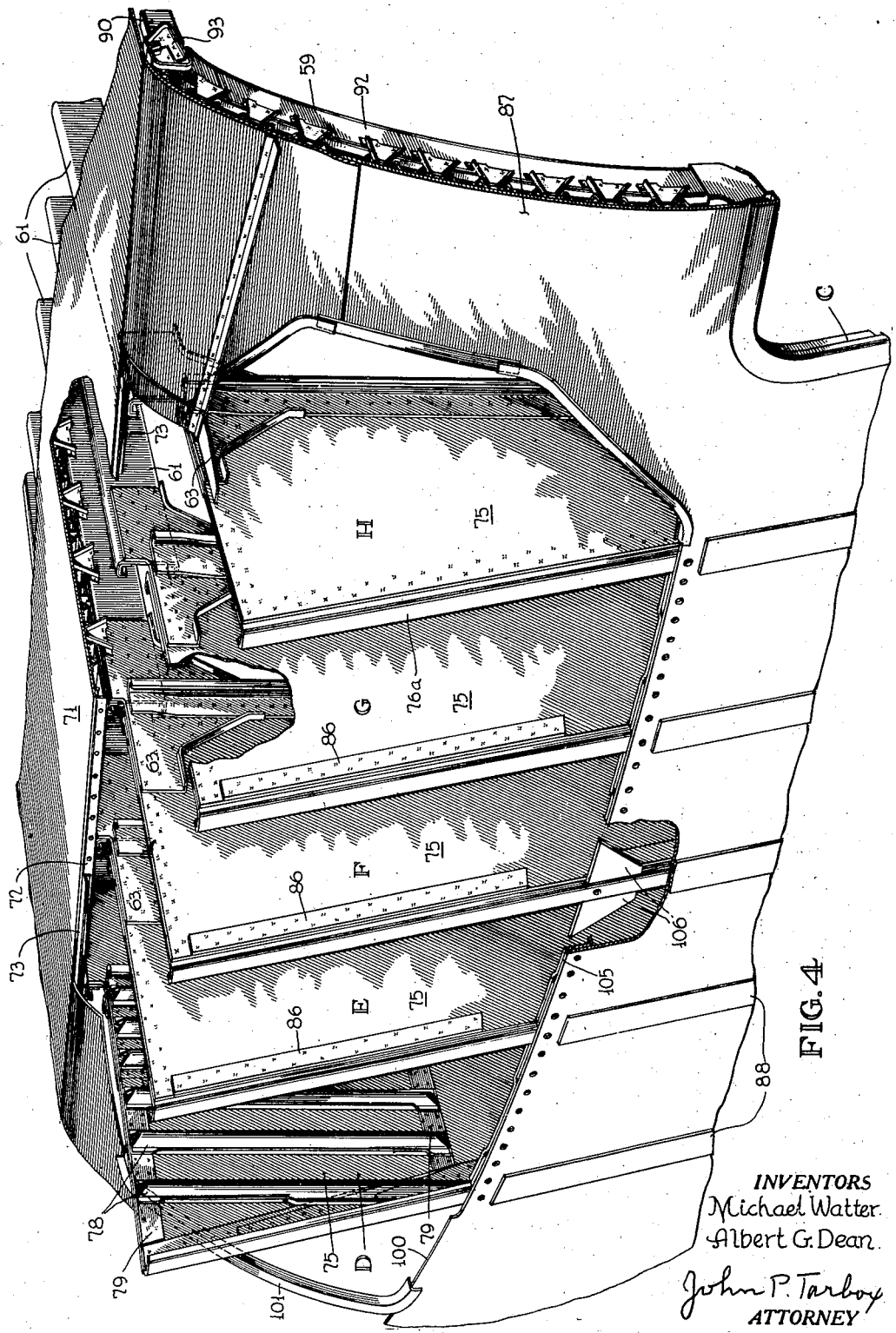

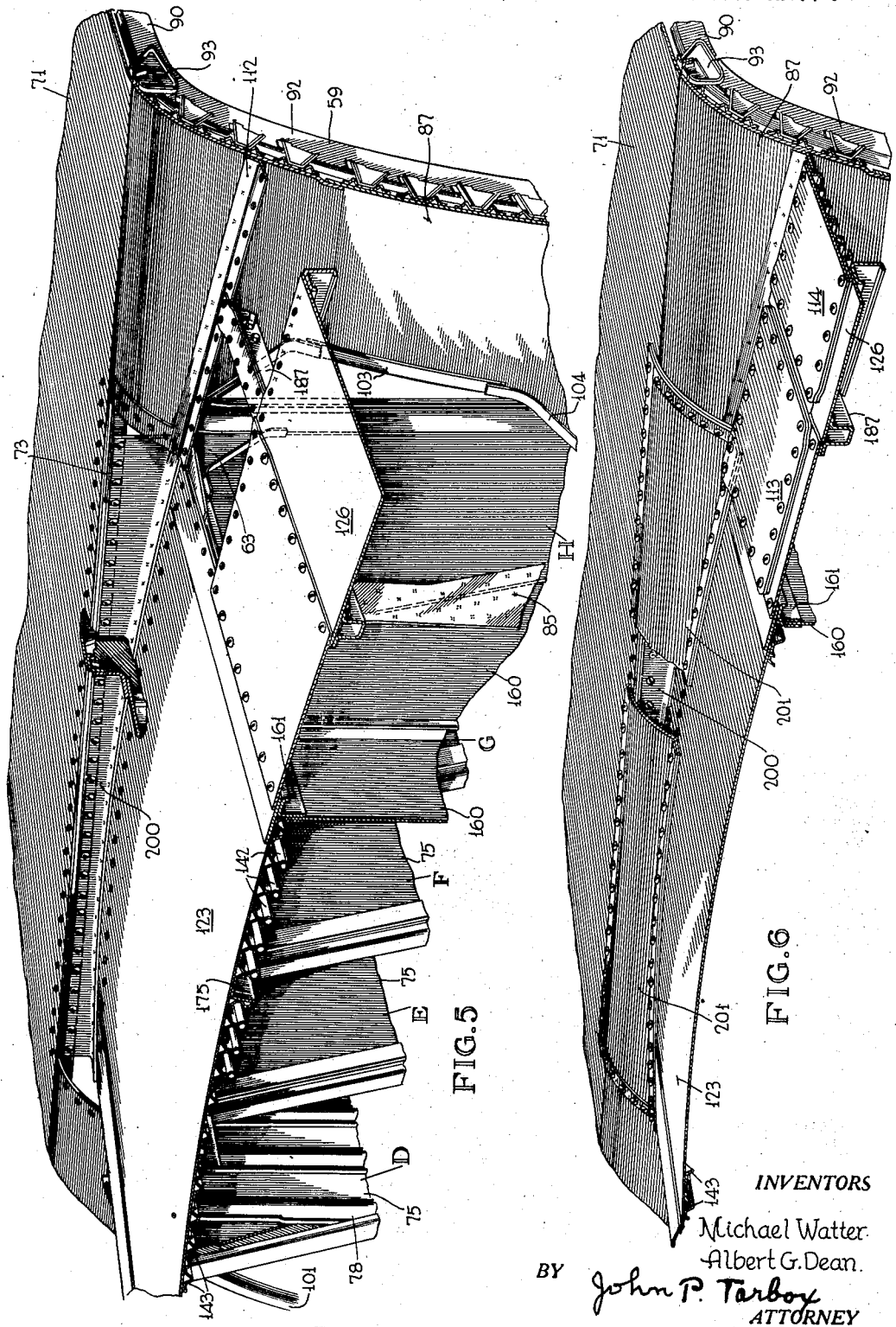

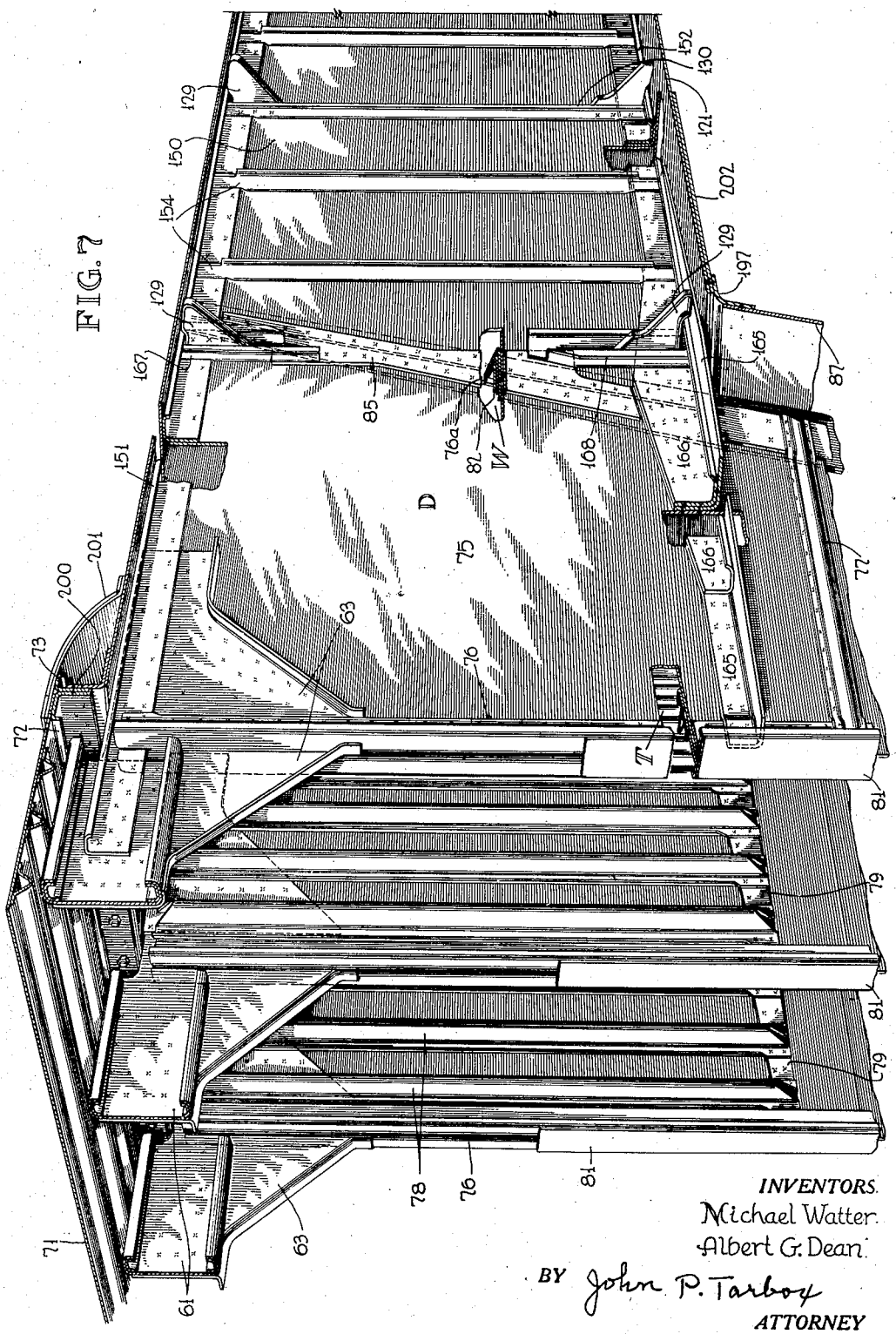

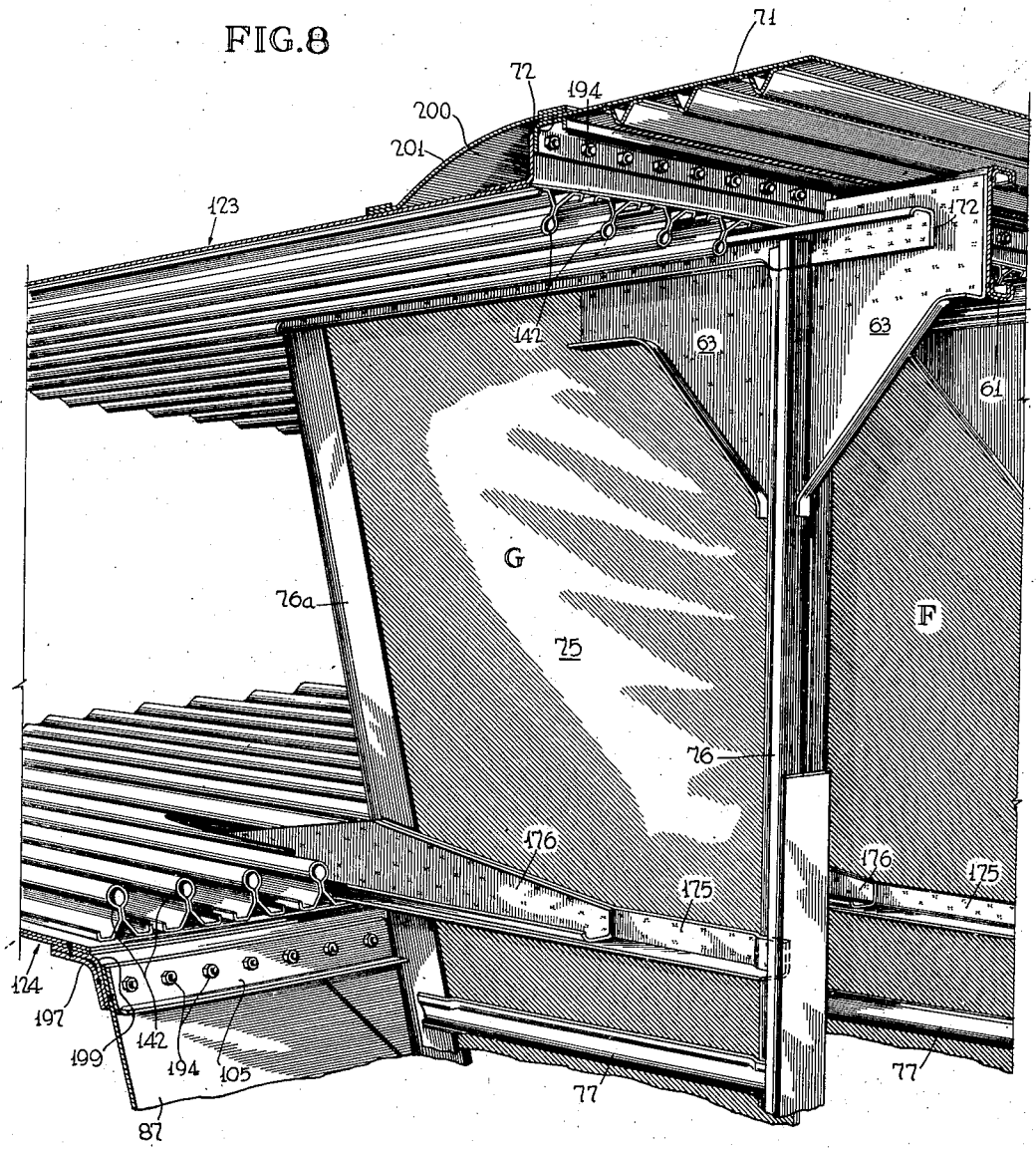

Feb. 18, 1947.  M. WATTER ET AL  2,416,245
AIRCRAFT FUSELAGE AND WING CONSTRUCTION
Filed June 28, 1943   14 Sheets-Sheet 8
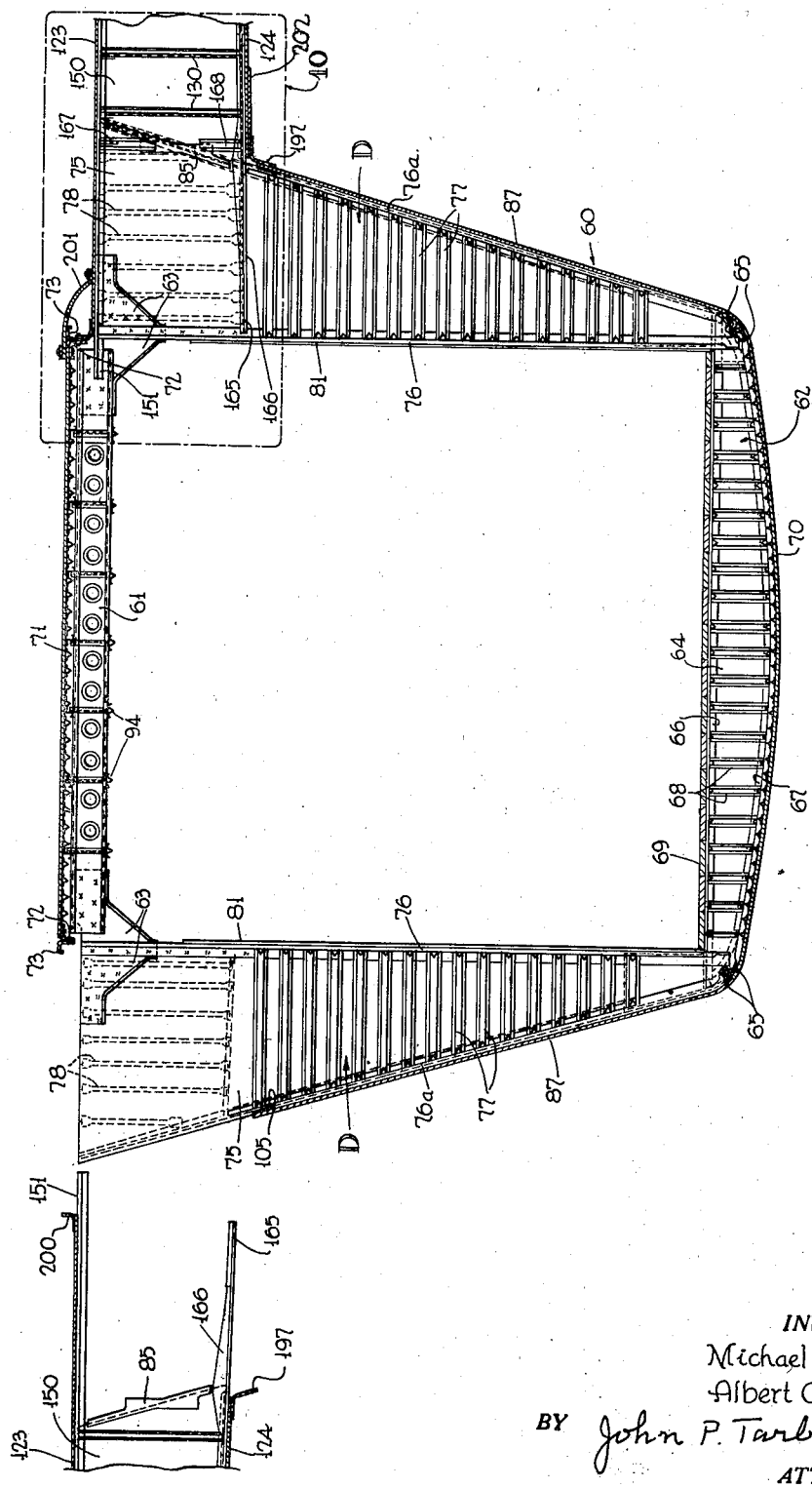
INVENTORS.
Michael Watter.
Albert G. Dean.
BY John P. Tarbox
ATTORNEY

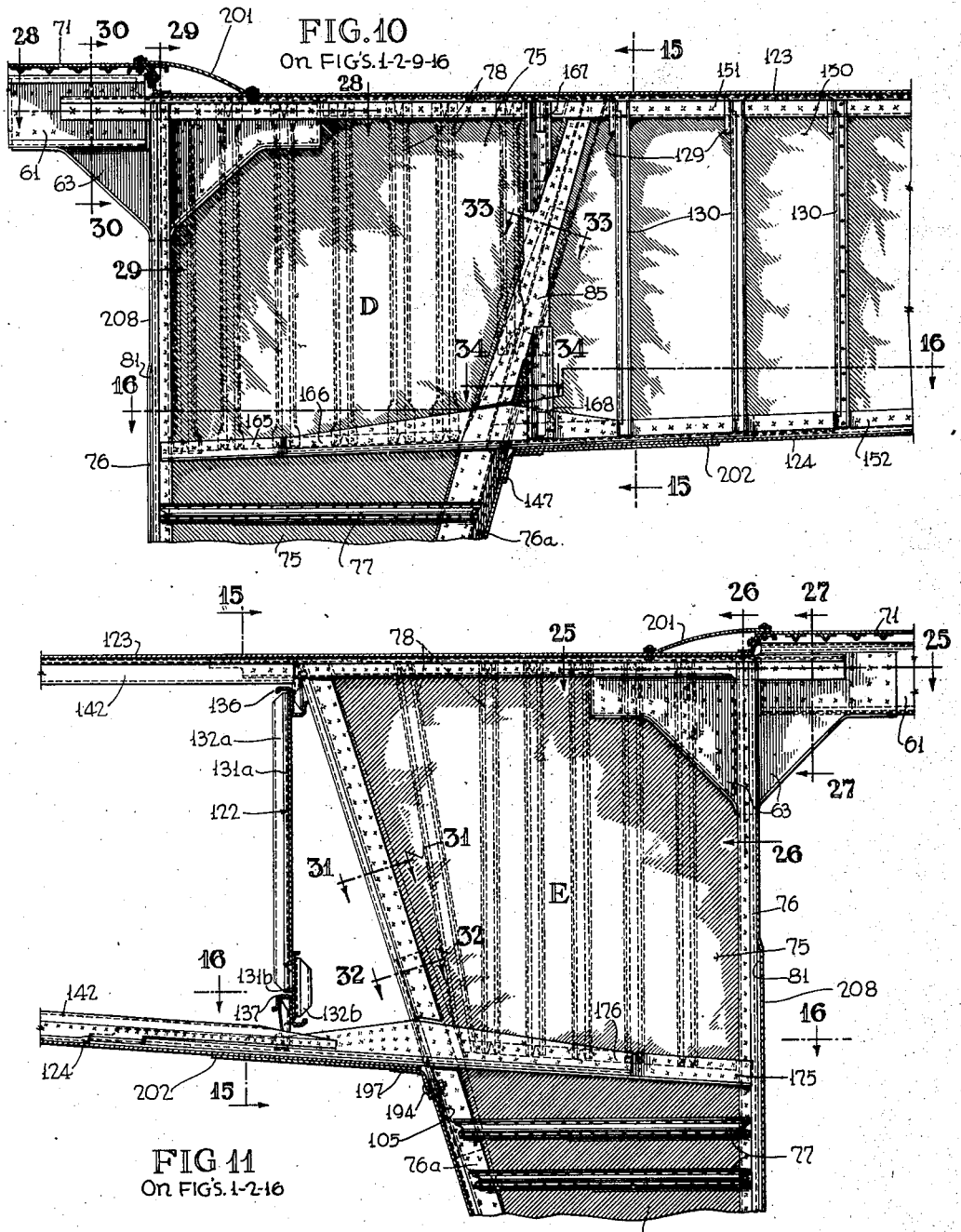

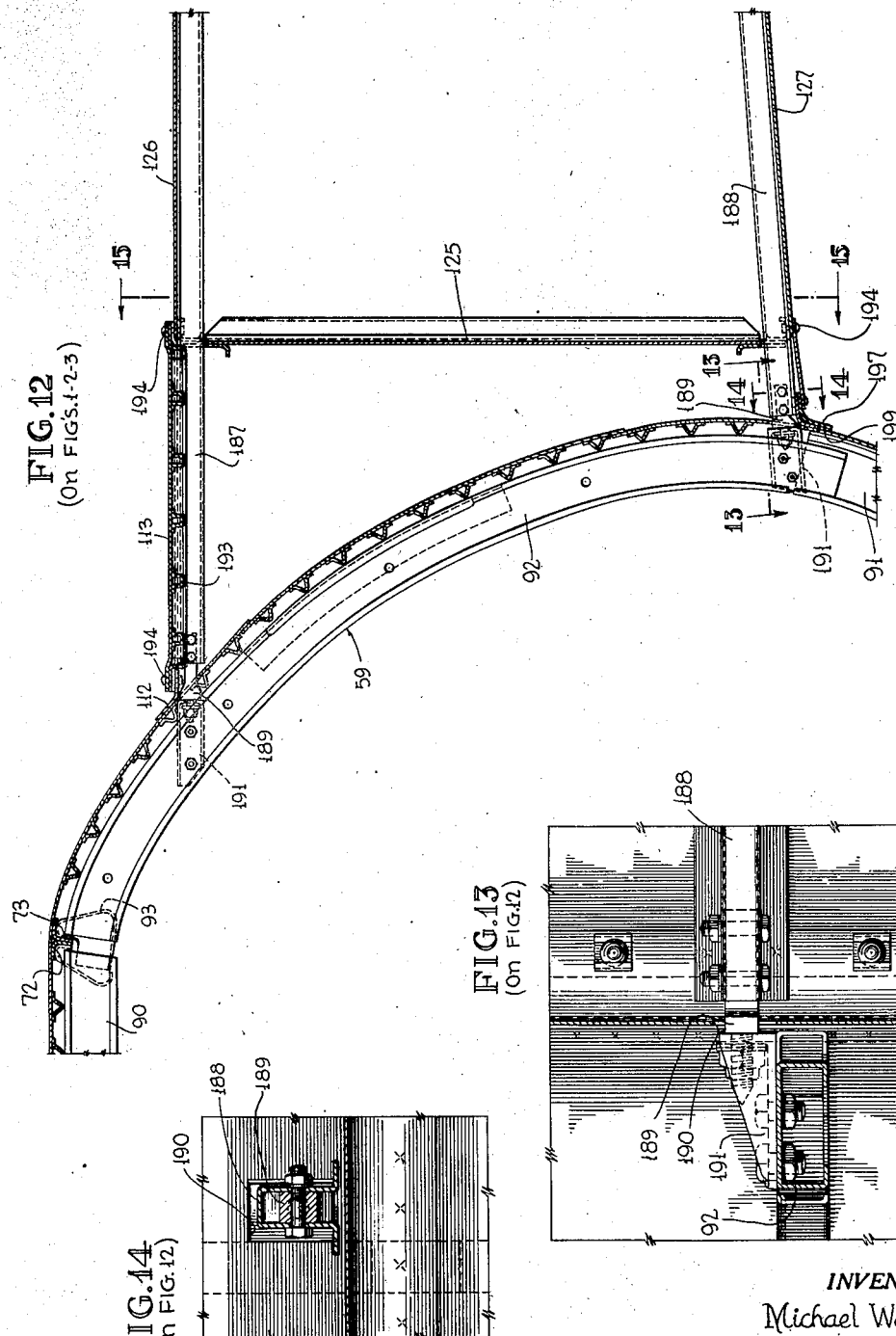

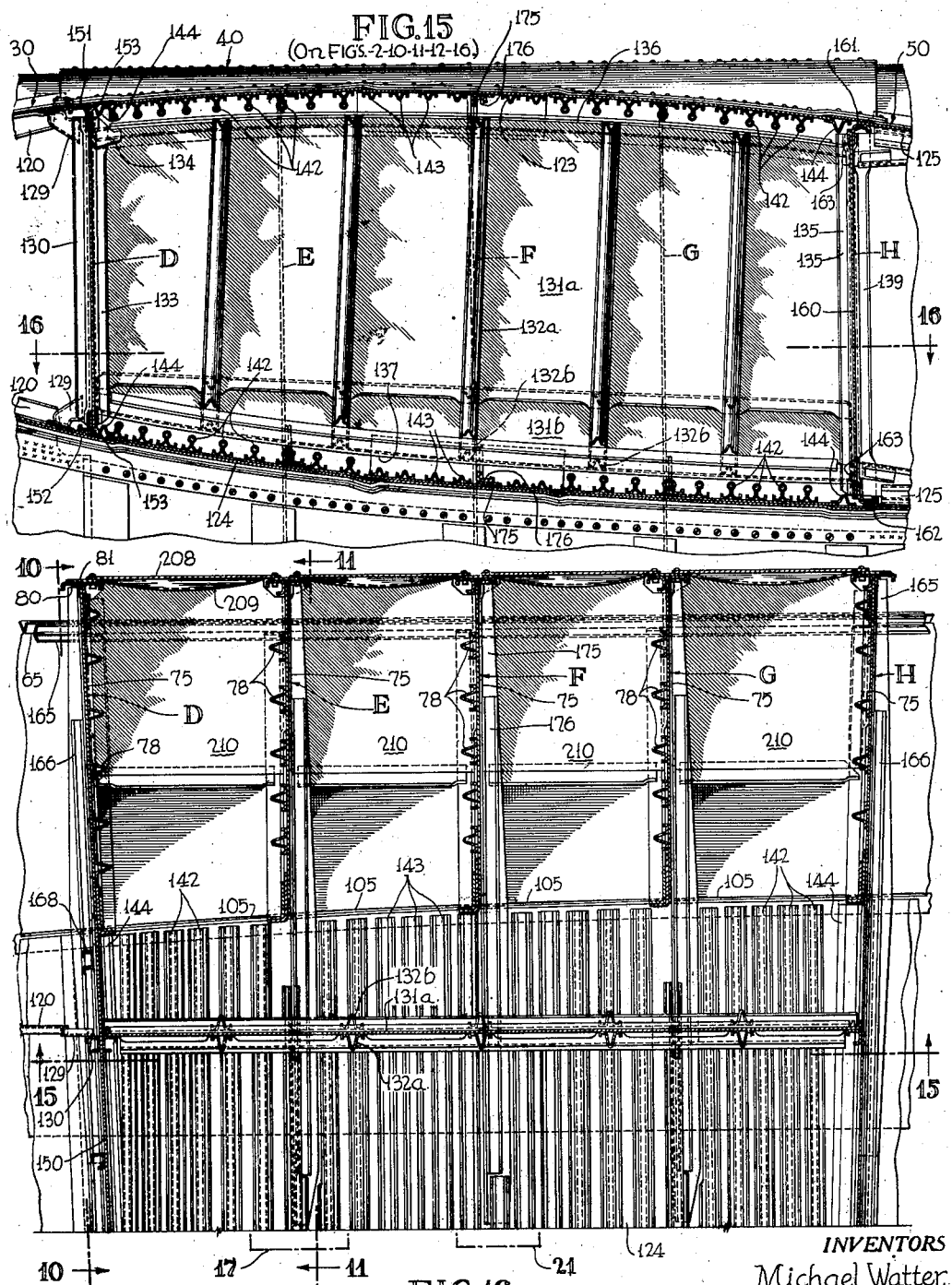

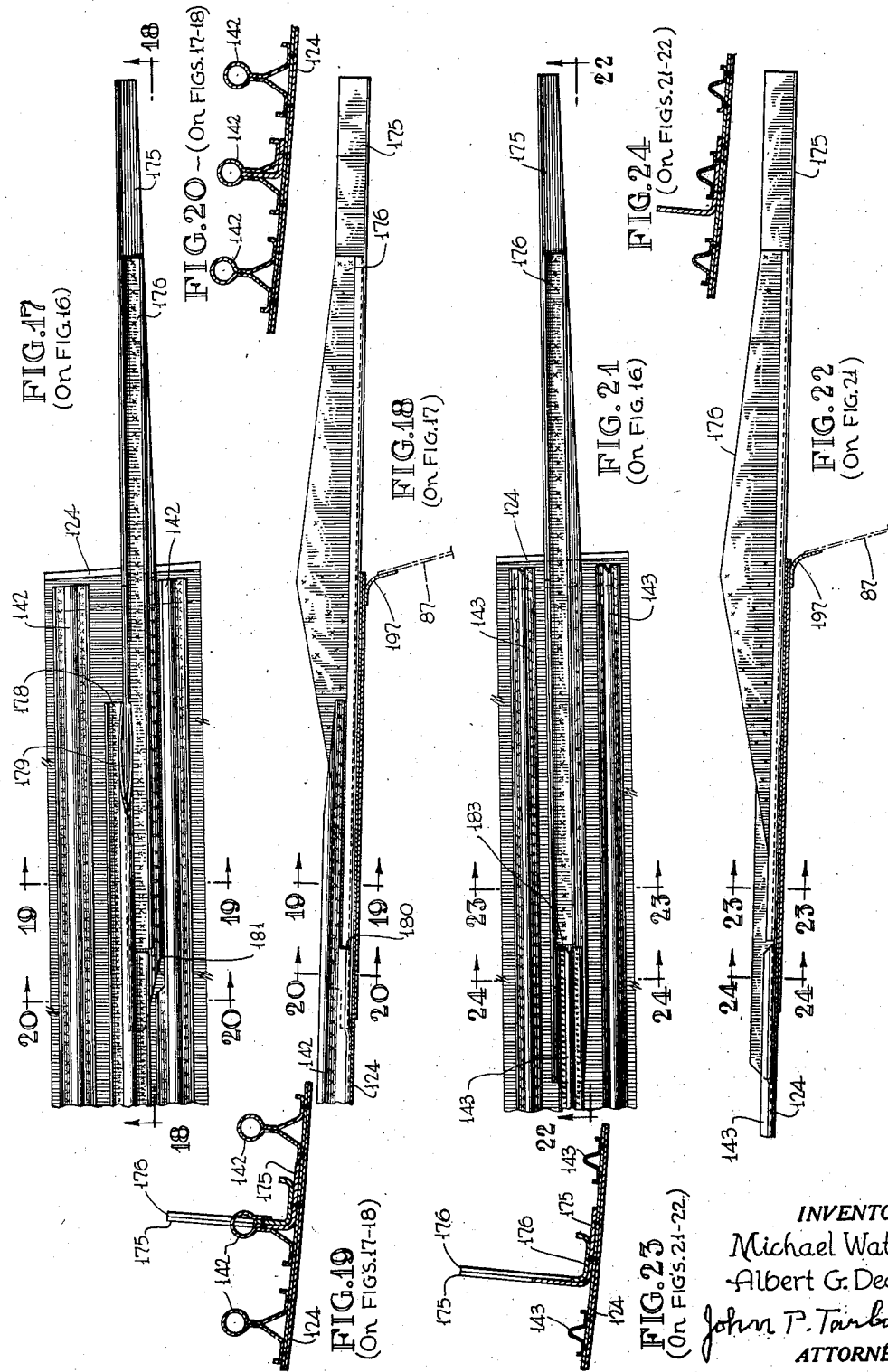

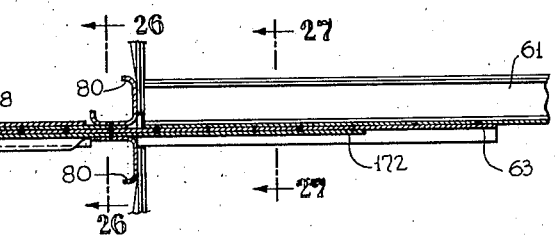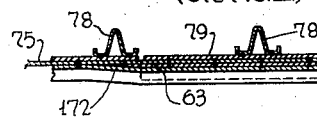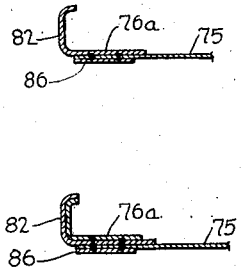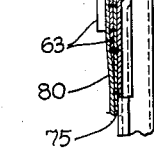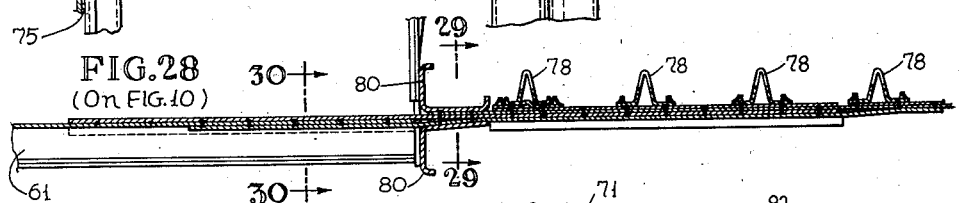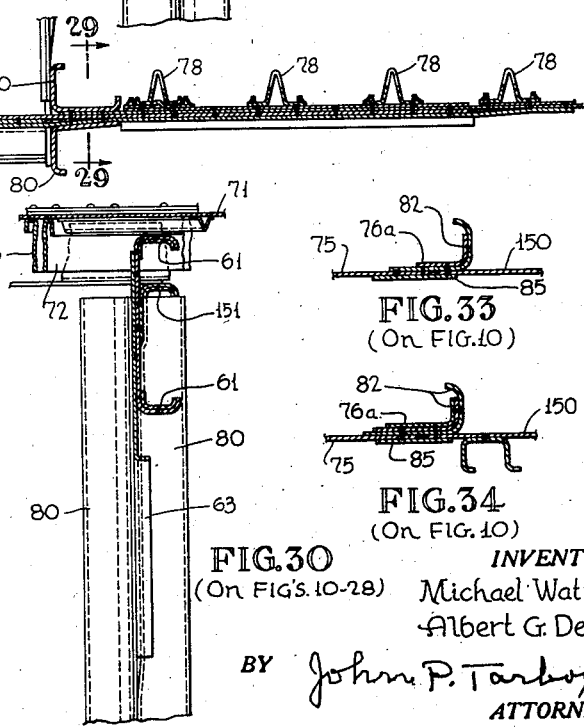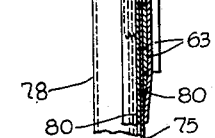

Feb. 18, 1947. M. WATTER ET AL 2,416,245
AIRCRAFT FUSELAGE AND WING CONSTRUCTION
Filed June 28, 1943 14 Sheets-Sheet 14

INVENTORS
Michael Watter.
Albert G. Dean.
BY John P. Tarbox
ATTORNEY

Patented Feb. 18, 1947

2,416,245

UNITED STATES PATENT OFFICE 2,416,245

AIRCRAFT FUSELAGE AND WING CONSTRUCTION

Michael Watter, Philadelphia, and Albert G. Dean, Narberth, Pa., assignors to The Budd Company, Philadelphia, Pa., a corporation of Pennsylvania Application June 28, 1943, Serial No. 492,494

12 Claims. (Cl. 244—119)

This invention relates to aircraft, particularly to airfoil-to-body connections therefor, and has for an object the provision of improvements in this art. The invention is especially designed to provide sturdy connections between the wings and body or fuselage of an airplane while preserving the maximum clear space within the body for cargo.

One of the particular objects of the invention is to provide a strong body compartment structure which is adapted to anchor the wings.

Another object is to provide a structure which furnishes a very rigid wing support.

Another object is to provide quick assembly of the wings to the body.

Another object is to provide a wing structure which is adapted to transmit stresses from a secondary stress region of the body to a primary stress region to compensate for weakening the body as by a side opening in a secondary stress region.

Another object is to provide a joint between a body and an airfoil which utilizes the wing spars and reinforced skin blankets in an advantageous manner in making the connections.

Another object is to provide a wing-body joint which can be conveniently and effectively connected, particularly by spot welding methods, at least in large part.

Another object is to provide a body bulkhead unit adapted to carry the wings which is composed of a plurality of skin-reinforced bulkhead elements.

Another object is to provide a wing and body construction formed entirely or substantially of sheet metal, cold-rolled stainless steel being the metal especially contemplated herein.

The above-mentioned and other objects of the invention will be apparent from the following description of an exemplary embodiment thereof which is illustrated in the accompanying drawings, wherein:

Fig. 3 is a partial side elevation of the fuselage without the wing;

Fig. 4 is an enlarged side-top-rear perspective view of the primary wing attachment zone shown in Fig. 3;

Fig. 5 is a similar perspective view with the wing attached and parts cut away;

Fig. 6 is a similar perspective view of a smaller area after additional fairing strips have been attached;

Fig. 7 is an inside side-front perspective view of a portion of the primary wing attachment zone, parts being cut away to reveal sectional structure;

Fig. 8 is an inside side-rear perspective view of a portion of the primary wing attachment zone, the view being taken in an intermediate portion of this zone;

Fig. 9 is a vertical transverse rearward-looking section taken on the line 9—9 of Figs. 1 and 2; the right wing being unattached instead of the left as in Fig. 2;

Fig. 10 is an enlarged view of the zone 10 of Fig. 9, the section being indicated on Figs. 1, 2 and 16;

Fig. 11 is a view similar to Fig. 10 but showing an intermediate rather than a front portion, the view being taken on the line 11—11 of Figs. 1, 2 and 16;

Fig. 12 is a partial enlarged vertical transverse section in the secondary wing attachment zone, the view being taken on the line 12—12 of Figs. 1, 2 and 3;

Fig. 13 is a partial enlarged horizontal section taken on the line 13—13 of Fig. 12;

Fig. 14 is a partial enlarged vertical section taken on the line 14—14 of Fig. 12;

Fig. 15 is an enlarged partial vertical chordwise section taken on the line 15—15 of Fig. 2, the section also being indicated on Figs. 10, 11, 12 and 16;

Fig. 16 is a horizontal section taken on the line 16—16 of Fig. 15, the section also being indicated on Figs. 10 and 11;

Fig. 17 is a fragmentary enlarged horizontal section of parts shown in the area 17 of Fig. 16;

Fig. 18 is a vertical section taken on the line 18—18 of Fig. 17;

Fig. 19 is a section taken on the line 19—19 of Figs. 17 and 18;

Fig. 20 is a section taken on the line 20—20 of Figs. 17 and 18;

Fig. 21 is a fragmentary enlarged horizontal section of parts shown in the area 21 of Fig. 16;

Fig. 22 is a vertical section taken on the line 22—22 of Fig. 21;

Fig. 23 is a section taken on the line 23—23 of Figs. 21 and 22;

Fig. 24 is a section taken on the line 24—24 of Figs. 21 and 22;

Fig. 25 is an enlarged horizontal section taken on the line 25—25 of Fig. 11;

Fig. 26 is an enlarged vertical section taken on the line 26—26 of Fig. 11, the section also being indicated on Fig. 25;

Fig. 27 is an enlarged vertical section taken on the line 27—27 of Fig. 11, the section also being indicated on Fig. 25;

Fig. 28 is an enlarged horizontal section taken on the line 28—28 of Fig. 10;

Fig. 29 is an enlarged vertical section taken on the line 29—29 of Fig. 10, the section also being indicated on Fig. 28;

Fig. 30 is an enlarged vertical section taken on the line 30—30 of Fig. 10, the section also being indicated on Fig. 28;

Fig. 31 is an enlarged horizontal section taken on the line 31—31 of Fig. 11;

Fig. 32 is an enlarged horizontal section taken on the line 32—32 of Fig. 11;

Fig. 33 is an enlarged horizontal section taken on the line 33—33 of Fig. 10;

Fig. 34 is an enlarged horizontal section taken on the line 34—34 of Fig. 10;

Fig. 35 (on Sheet 3) is an enlarged partial inside side perspective of a shear connection between an intermediate bulkhead and a wing skin blanket, the view being referred to the right wing instead of the left wing as are the other detail views, the location of the view being indicated by the line 35—35 on Fig. 2;

General arrangement

Figure 1:
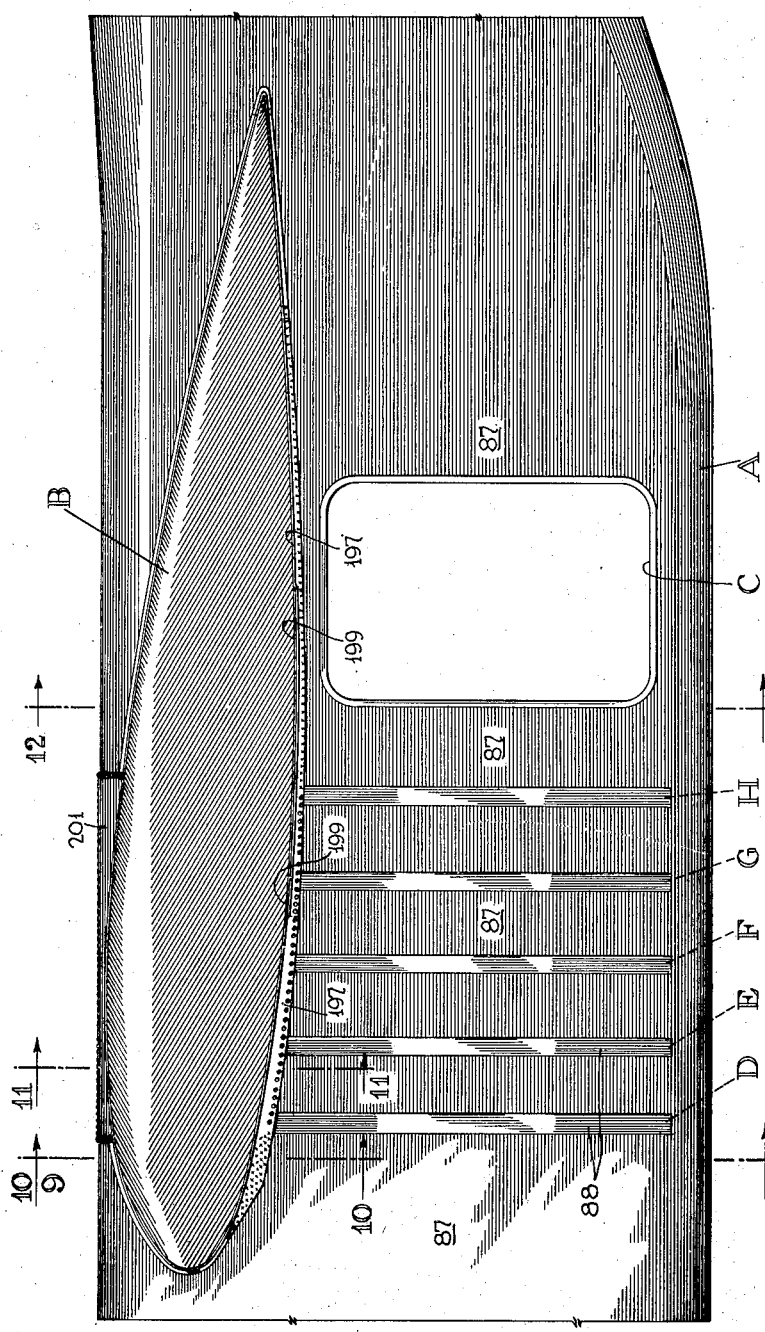
Fig. 1 is a side elevation of the central portion of an airplane which embodies the present invention.

Although the invention has wide applications, it has especial advantages in connection with airplane wing-to-fuselage joints, particularly in connection with cargo planes having clear compartment space between the wing roots and having a door opening on one or both sides beneath the wing, and so will be specifically described in this connection.

The floor of a cargo body must be built to withstand heavy loadings; hence the floor girders or beams are made correspondingly strong. The body requires great rigidity, particularly in that portion of its length which is supported by the wings; hence the side walls are reinforced by bulkhead elements and the roof girders or beams are made sufficiently strong to take the required compression loads. Such a body construction is strong enough and rigid enough to furnish an efficient anchorage for the wings; hence the wings are anchored to the body bulkhead sides, thus avoiding the necessity for providing additional weight-adding structures for the wing anchorages, as for example the necessity for providing through-running wing spars, either in the cargo compartment, where they would obstruct the space, or outside the body, where they would largely impose parasitic drag.

The airplane illustrated herein is of the high-wing type in which the wings are rigidly anchored to the upper ends of the bulkhead side portions of the body; hence the bulkhead unit on each side acts as the arm of a bell-crank lever of which the wing constitutes the other arm. For this purpose, the side of the bulkhead unit is made deep in spanwise direction in the wing-attached portion and narrower toward the lower end where it connects with the floor girders. In vertical spanwise section the side of the bulkhead unit is triangular, the interior side being vertical.

The floor girders are made deep in the center for cargo load carrying strength, the upper or inside chord of the girder being straight and the lower chord being convex. When the airplane is in flight the lower chord tends to straighten in tension, due to the cantilever action of the wings and bulkhead units, and the floor girders tend to bend upward at the center due to air pressure, but this bending tendency is opposed by the weight of the cargo on the floor. Consequently, the loading factors compensate and provide a favorable stress resultant in the floor girders. The in-flight resultant on the roof girders is equally favorable. The cantilever action of the wings compresses the roof girders and tends to bend them downward in the center; but the air above exerts a lifting action tending to restore the girders to straight condition. In consequence, the body box section shape is substantially maintained and the up-bending effect on the wings is kept at a minimum.

In landing, the motors mounted on the leading edge of the wings outboard from the body and forward of the main landing wheels, impose heavy shear stresses in the wing-to-body anchorages. The structure disclosed herein is well adapted to withstand these shearing stresses as well as the other stresses which must be taken. Also in landing, since the main supporting wheels are located beneath the motor nacelles, the body imposes heavy shear on the wing anchorages.

In landing, also, the overhanging tail of the body together with cargo stored behind the landing gear exerts a bending moment on the body near the landing gear zone. This tends to flatten the body vertically in the region of the door which in turn tends to cause the body to bulge here. The wing structure is so formed and arranged as to resist this tendency to bulge. Specifically, the wing root and body structure forms a kind of C-unit, viewed horizontally, which is strong in the primary stress zone through the body bulkheads to resist bulging in the weak secondary stress zone in the region of the door.

The primary stress zone of the body coincides with the primary stress zone of the wings. Specifically, the body comprises a bulkhead unit composed of five connected bulkheads, two of which, fore and aft, are connected to the fore and aft spars of the wing and three of which, intermediately, are connected to the heavy, stringer-reinforced skin blankets of the wings.

The wings are provided with projecting shear coupling members, and during assembly are moved endwise until these coupling members are telescoped with the bulkheads, after which the connections are made. The connections are made in large part by spot welding operations, the parts being accessible for welding tools from inside the body and from the door or doors. Alternatively, the bulkhead sides may be pre-assembled with the wings and later attached to the top and bottom assemblies.

Thereafter the fairing or closure pieces are assembled.

General arrangement by reference to the drawings

Figure 2:
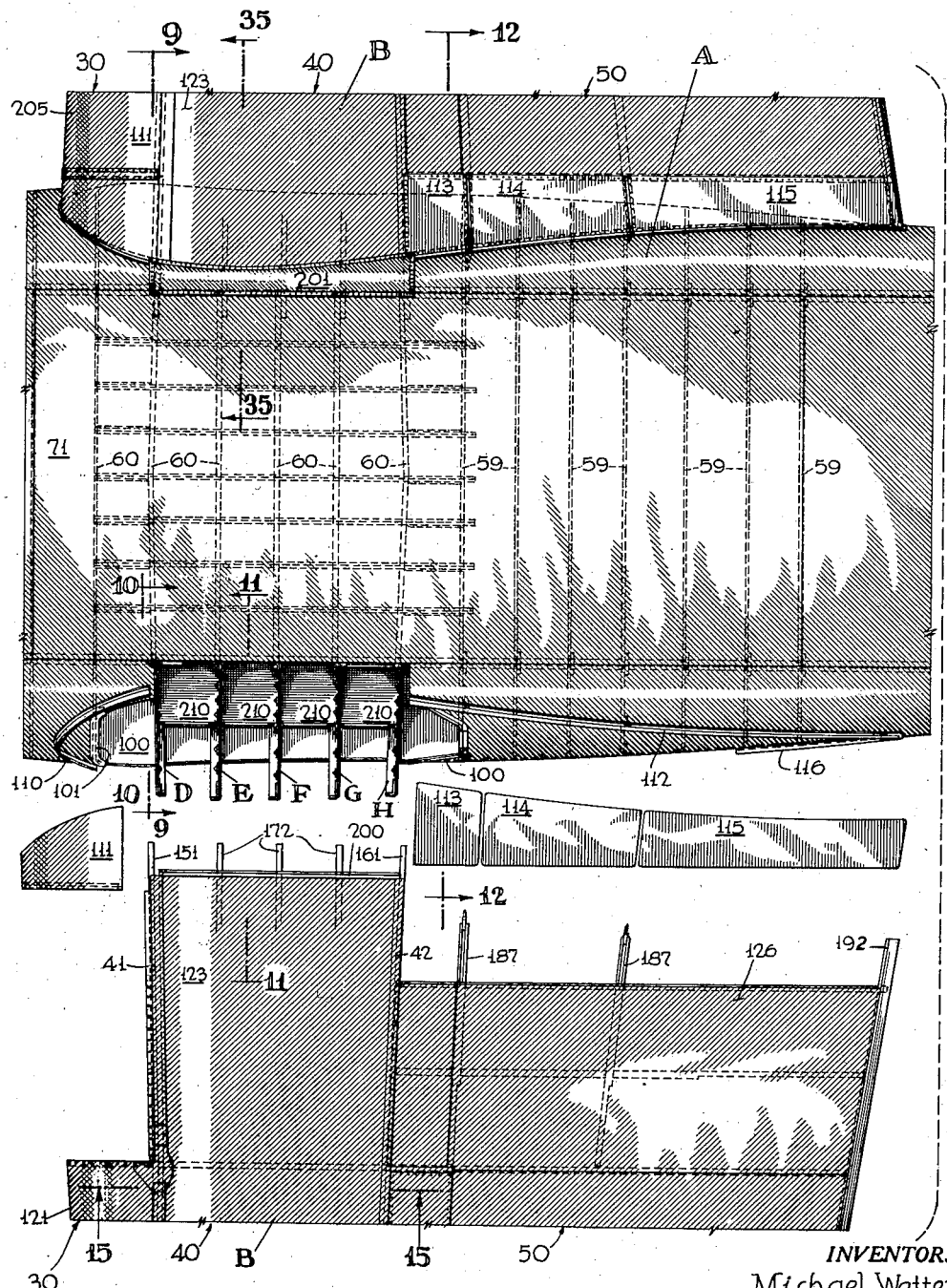
Fig. 2 is a plan view of the same, the left wing and certain fairing strips being shown in preassembly relationship.

As shown in Figs. 1 and 2, the airplane here illustrated comprises a cargo body A and wings B. The right wing in Fig. 2 is shown in assembled position and the left wing is shown in pre-assembly position with some of the top fairing pieces located between the body and wing.

The wing comprises a leading or nose section 30, a main load-carrying section 40, and a trailing section 50. A forward spar 41 and a rear spar 42 are integral parts of the main wing section 40. The wings, or at least the inner panels thereof if they are formed of a plurality of panels as preferred, are completely formed as separate subassemblies before they are brought to the body for attachment. Their root ends are adapted to be telescoped into the sides of the body by endwise, i. e., spanwise, movement; after which they are attached.

In the region of the trailing section of the wings the body is provided with an opening C in one or both sides, both in the preesnt case. In the present instance also the opening is a door for the passage of cargo, either personnel, equipment, or supplies.

As shown in Fig. 2, the body comprises a plurality of transverse girdle frames, most of them 59 being light and formed with generally rectangular interior compartment openings and those in the major stress zone being very strong and comprising bulkheads 60 which are made deep spanwise on the sides and formed with a more nearly exact rectangular interior opening. The bulkheads from front to rear, are designated as D, E, F, G and H.

Body and bulkheads

A section at the front bulkhead is shown in Fig. 9. Here it may be seen that the two deep sides of the forward bulkhead D are connected at the upper end to a roof girder or beam 61 and at the bottom to a floor girder or beam 62. The connection to the roof beam is made through strong gussets 63 and the connection to the floor beam is made through projections of the floor beam web 64 and by mating flanged longerons 65.

In addition to the web 64, the floor beam 62 comprises chords 66 and 67 and vertical stiffener ribs 68. The floor beams 62 are covered interiorly by a floor 69 and exteriorly by a stringer-reinforced skin blanket 70. The roof is covered by a stringer-reinforced skin blanket 71. The side edges of the roof skin blanket 71 are reinforced by angle-shaped edge stiffeners or longerons 72. At the front and rear portions of the heavy stress zone a skin tie-in member 73 is welded to the longerons 72.

Each bulkhead side comprises a triangular web 75, converging chords 76, 76a, horizontal stiffener ribs 77 on the lower portion below the wing, and vertical stiffener ribs 78 and transverse plates 79, Fig. 7, on the upper portion within the wing zone. The construction of the upper portion of the forward bulkhead D and the next adjacent bulkheads E and F is shown in enlargement in Fig. 7. As seen in the broken section T in Fig. 7 and in Figs. 16, 25 and 28, the inner chord 76 comprises two angle elements 80, one welded on each side of the web, and a cap strip 81. As seen in the broken section W of Fig. 7, and in Figs. 16, 31, 32, 33 and 34, the outer chord 76a comprises a plurality (three shown) of nested angle members 82 welded to the inclined outer edge of the bulkhead web 75. For the fore and aft bulkheads D and H which are to be connected to the wing spar elements the side edge of the angle members may be left extending beyond the outer edge of the webs 75. After assembly the joints on the side opposite the angle members may be covered by a plate 85. As shown at the left side of Fig. 4, the nested angle members 82 die out at different points vertically. Also, the outer edges of the intermediate bulkheads E, F and G, are strengthened opposite the angle members 82 by plates 86. The sides of the bulkhead unit are covered by skin blankets 87 which continue fore and aft as a body skin blanket. The connections of the skin blankets 87 to the sides of the bulkheads below the wings are reinforced by thin vertical weld strips 88 on the outside of the skin.

Body frame in secondary stress zone

As shown in Fig. 12, the body girdle frames 59 in the secondary zone comprise light roof girders or beams 90, outwardly inclined side studs 91, and curved crown connecting beams 92. The roof skin blanket 71 is a continuation of the roof skin blanket 71 of the primary stress zone and the blanket 87 is a continuation of the side skin blanket of the primary stress zone. The frame in the secondary stress zone is made relatively light to permit some bulging near the top whereby the wings will absorb the stresses and thus avoid breakage of the body frame as might occur if it were made too stiff. The beams 92 at the lower end overlap the side studs 91 and are welded thereto. At the upper end the beams 92 are connected to the roof beams 90 and to the longitudinal members 72, 73 by cupped gusset clips 93 welded thereto. As shown in Figs. 3 and 9, the lower edges of the beam 61 have ceiling stringers 94 secured thereto and at the ends of the heavy stress zone there are provided angularly disposed members 95.

Body opening for wing anchorage

As shown to best advantage in Figs. 3 and 4, the body skin cover 87 is cut away in the bulkhead zone to form a wing anchorage opening 100 and the upper and outer corners of the bulkheads project through the opening. At the front edge of the opening the skin sheet is reinforced by an angle strip 101 welded to the skin; at the rear edge by edge members 102, 103 and 104; and at the lower edge by angle strips 105 between the bulkheads. Small gusset plates 106 further reinforce the corners at the bulkheads.

Forward of the wing root opening 100 in the body (Figs. 2 and 3) there is secured a curved angle strip 110 to which there is later attached the inner edge of a nose fairing skin sheet 111. To the rear of the opening there is secured an upper angle strip 112 to which the inner edges of fairing sheets 113, 114 and 115 are secured. A lower angle strip 116 extends forward for a distance from the rear end of the upper angle strip 112 for anchorage of the lower skin sheet connection. Forward of the strip 116 (Fig. 12) where the door opening makes the use of welding tongs convenient the lower wing skin sheet connection may be welded directly to the body skin sheet.

Wing structure

The wings are built upon the forward spar 41 and the rear spar 42. As shown in Figs. 15 and 16, the wings further comprise nose rib elements 120, nose skin cover sheet 121, main rib elements 122, upper skin blanket 123, lower skin blanket 124, trailing section rib elements 125, and trailing section skin blankets 126, 127, upper and lower respectively.

The nose rib elements 120 are secured to the forward spar by gusset members 129 and vertical angle members 130.

The main rib elements 122 are formed of overlapped spliced webs 131a, 131b stiffened by overlapped strut ribs 132a, 132b. They are secured to the forward spar by angle members 133 and gussets 134 and to the rear spar by angle members 135. The main rib elements also include top and bottom chords 136 and 137.

The trailing rib elements 125 are secured to the rear spar by vertical angle members 139.

The skin blankets 123, 124 include stiff Y-bulb stringers 142 adjacent the spars and lighter hat-shaped stringers 143 in the intermediate zone. Immediately along the spars there are border hat-shaped stringers 144.

The forward spar 41 includes a web 150, an upper angle-shaped cap strip or chord 151, and a lower cap strip 152. Reinforcing strips 153 may also be provided for the upper and lower edges of the web on the side opposite the chords, and vertical web stiffeners ribs 154 on the same side as the chords.

The rear spar 42 includes a web 160, an upper angle-shaped cap strip or chord 161, and a lower cap strip 162. Reinforcing strips 163 may also be provided for the edges of the web.

Wing-to-bulkhead connection

As shown in Figs. 2 and 9, the wings are provided with top and bottom shear strips which are pushed endwise into the bulkhead structure and are welded thereto. The upper skin blanket 123 of a wing extends across the tops of the bulkheads to the body and the lower skin blanket 124 stops at the outer side of the bulkhead structure.

As shown in Fig. 7, the web 150 of the forward spar is cut off at an angle at the inner end to fit adjacent the bulkhead web 75 and is welded through the overlapping angle 82 and the joint cover plate 85. The upper spar chord 151 runs through alongside the smooth upper side of the bulkhead web and into the end of the roof beam 61, overlying the gusset plate 63 at its inner end, and is welded to these members along its overlapped length as indicated. At the bottom a long angle-shaped member 165 is spliced into the spar with the lower chord 152 and a short angle-shaped member 166 is spliced within the first. The vertical flanges of both members 165 and 166 are deepened for strength at the meeting line between bulkhead and spar webs. The splice pieces 165, 166 lie alongside the smooth face of the bulkhead web and are welded thereto, as indicated. The inner end of the splicer 165 is joggled at the end to fit the flange of the bulkhead chord member 80 and is welded thereto. In Fig. 7 it can also be observed that the cover strip 85 is joggled on the edges and that short channel stiffeners 167, 168 are welded to the adjacent bulkhead and spar webs respectively in the joggles to provide greater strength for a nose rib element which is secured here. The gussets 129 for the nose rib are shown but the nose rib itself is omitted in Fig. 7.

The rear spar connection is very similar to that of the front spar, so is not specially illustrated or described.

At the three intermediate bulkheads, E, F and G, the wings are anchored through their upper and lower skin blankets. At the upper skin blanket, as shown in Figs. 8 and 11, a member 172 is spliced into the end of a skin blanket stringer 142 and extends alongside the bulkhead web 75 past the gusset plate 63 and into the end of a roof beam 61. It is welded to all of these contiguous members.

At the lower skin blanket, a long member 175 and a short member 176 are spliced into the end of a blanket stringer 142 and are welded to the contiguous bulkhead web 75 and to the bulkhead chord member 80, being joggled to accommodate the latter. Both members or splicers 175, 176 are deepened at the edge of the bulkhead for strength.

In Figs. 17–20 the details of this splice between the members 175, 176 and the blanket stringer 142 are shown. The stringer is made somewhat shorter than the adjacent stringers, as at 178, and is slit at the end, as at 179. Also the bottom flange on one side is cut away for a greater distance, as at 180. The side edge of the adjacent stringer is cut away, as at 181, to accommodate the widened base flange of the bottom member 175. Both members 175, 176 underlie the end of the stringer and are welded both to the stringer and to the skin sheet.

Referring to Figs. 21 to 24, where the members 175, 176 are rooted in the center of the main wing section and the hat-shaped stringers 143 are encountered, one is cut away for a considerable distance from the end, as at 183, to accommodate the end of the shorter member 176 and the base flange of the longer member 175 is placed under the end of the stringer. The members 175, 176 are welded both to the stringer 143 and to the skin sheet.

Trailing section anchorage

Referring to Figs. 2, 3, 12, 13 and 14 the connections for the trailing edge section or secondary stress zone are shown. The top and bottom skin blankets 126, 127 are provided with spanwise extending strut members 187, 188 respectively which are anchored at their outboard ends to the skin and to the ribs 125. At their inner ends the strut members are provided with threaded plugs 189 which extend through small holes 190 in the side skin blanket 87 of the body and are anchored in socket brackets 191 which are bolted or otherwise secured to the body frame members 92.

At the rear edge of the trailing section an edging member 192, which secures the converging skin sheets 126, 127 together, projects for a distance to find anchorage at the junction of the angle strips 112 and 116 on the body and is secured thereto.

The fairing strips 113, 114 and 115 at the top of the wing are provided with interior reinforcement 193 and are secured to the skin blanket 126 and the angle piece 112 of the body by screws or bolts 194.

At the bottom of the wing the rear part of the lower trailing skin blanket, or a suitable fairing filler piece, is anchored to the body angle piece 116. Forwardly of the angle piece 116 the lower skin blanket is provided with an angle piece 197 which is welded to the body skin sheet 87, the door opening C providing access for welding tongs here. This angle piece 197 forms an important longeron for transferring wing torque into the body. An opening in the skin is closed by a plate 198 secured by screws or bolts 194. An added strengthening angle piece 199 (see Fig. 1) extends with the angle piece 197 from the door region up into the primary stress zone, specifically from about the middle of the door zone to a point just forward of bulkhead G.

Exterior connection in primary zone

As shown in various views, best perhaps in Fig. 5, the upper skin blanket 123 of the main wing section has welded thereto an angle-shaped piece 200, the upper edge of which is secured as by bolts or screws 194 to the longeron 72 (Figs. 8, 11) or to both the longeron 72 and the tie member 73

(Figs. 7, 9, 10). After attachment of the angle piece 200, the nose fairing piece 111, and the trailing fairing piece 113, the upper skin 123 is faired to the body by a fairing piece 201 secured by bolts or screws 194.

At the bottom of the wing (Fig. 1), the angle piece 197 extends forward from the trailing section along the main wing section to the nose section, a reinforcing sheet 202 being disposed at the inner edge of the skin blanket 124, beneath the outwardly extending flange of the member 197. In the main wing section the lower flange of the angle piece 197 is secured to the body blanket 87 by bolts or screws 194, and forward of the front spar and bulkhead it is secured by welding. The extension of the body opening 100 forward of the spar and front bulkhead provides access for welding tongs in this region when the nose fairing piece 111 is not present. Another removable nose closure piece 205 is also provided.

*Bulkhead walls*

As shown in Fig. 16, the space between the inner ends of the bulkheads is closed by removable side wall plates 208. The plates are strengthened to resist pressure of cargo material by stringers 209. In most of the other views, these plates are omitted, but they are shown in Figs. 10 and 11.

The bulkhead structure is strengthened by horizontal plates 210 (Fig. 16) secured between bulkheads.

*Assembly*

The assembly procedure may be explained by reference to Fig. 9. The body at the bulkhead unit is assembled in four parts, namely, the two sides with the triangular bulkhead elements and skin blanket, either before or after the wings are secured to the bulkhead sides, the bottom with floor girders and skin blanket, and the roof with roof girders and skin blanket. The sides and bottom are secured together by welding the juxtaposed flanges of longerons 65 together and by welding flat gusset plates (not detailed) to the girder webs and the side webs of the bulkheads. The sides and top are secured together by welding the juxtaposed flanges of the longerons 72 and 73 together and by welding the gussets 63 to the girder webs and the side webs of the bulkheads. The wing anchorage openings 100 leave the top outer corners of the bulkheads exposed for the introduction of the root end of the wing.

As shown in Fig. 2 and at the left of Fig. 9, the wing assembly with the projecting members 151, 165, 172, 187 and 191 is pushed endwise into position and these members secured to the sides of the bulkhead unit. The spar webs 150 are secured to the bulkhead webs 75 by splice plates 85. The upper angle piece 200 on the upper wing blanket is secured to the body longerons 72, 73 by bolts 194. The lower angle piece 197 on the lower wing blanket is secured to the body by bolts 194 in the middle (at the main wing section) and by welding at the ends, as heretofore described.

Thereafter the fairing pieces 111, 113, 114, 115, 193, 201 and 205 are attached in the manner heretofore described.

*Summary*

It is thus seen that the invention provides an improved wing-to-body root anchorage, including an improved open-compartment body frame construction to take the necessary stresses, and also an improved method of assembly.

The advantages of the construction in taking flight stresses have already been noted. It was shown how the cargo loading on the floor girders assisted in resisting the tendency of the girders to bend upward under wing loading stresses. Also it was shown how the upward air vacuum pull on the roof girders assisted in resisting the tendency of the girders to bend downward under wind loading stresses. A very rigid wing anchorage is thus effected.

Figure 36:
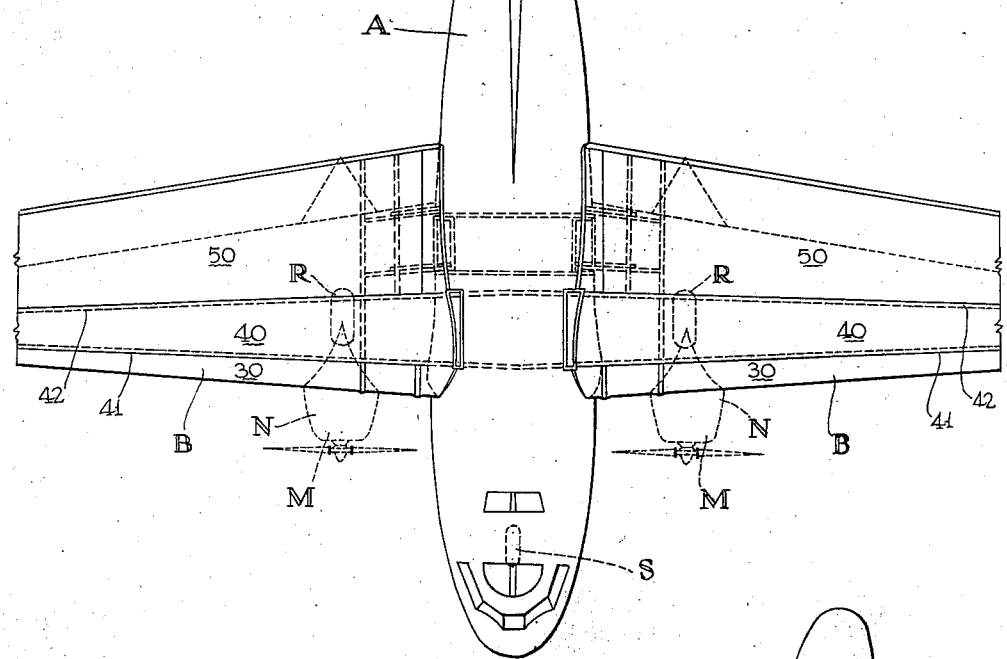
Fig. 36 is a plan view of a complete airplane embodying the invention.
Figure 37:
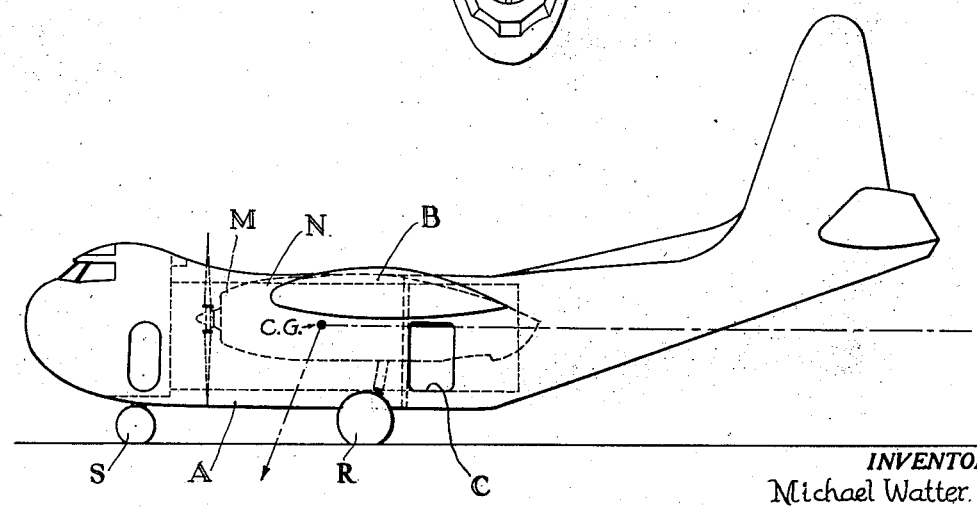
Fig. 37 is a corresponding side elevation.

The construction is equally well adapted to withstand landing stresses. This has been partly explained and may be understood more fully by referring to Figs. 36 and 37. Here it may be seen that the motors M are mounted on the leading edge of the wings and outboard from the wing roots in the body. Also that the tricycle landing gear includes two wheels R beneath the motor nacelles N near the rear spar 42 and a single front wheel S beneath the front of the fuselage. The center of gravity is located at C. G.

Assuming that the fully loaded plane is set down heavily on the rear wheels, it can be seen that the body, being suspended between the wheels, tends to bend and shear the wings at their roots to the body. This force acts in a manner similar to the in-flight forces and the bulkhead and wing anchorage unit is built strongly to resist it. Also the motors, being heavy and mounted on the leading edge of the wings well in front of the wheels R, tend to shear the wings off at their roots; but the bulkhead unit is built deep vertically and also long in a chordwise direction and is well able to withstand this force. Insofar as this action results in lifting the rear edge of the wings it is favorable in resisting the downward action produced by the unsupported weight of the tail. It has already been explained that the down swing of the tail tends to crush the body in the region of the door C; that this causes a bulging action in the light stress zone of the body above the door; and that the lateral rigidity of the wing skin and frame causes this bulging force to be transferred into the strong bulkhead and wing anchorages in the heavy stress zone of the body and wings. Now it can be seen that the bending stresses on the wing and the twisting stresses caused by the motor weight also assist in counteracting the body-bulging action caused by the weight of the tail.

Thus by causing normally objectionable forces to act against each other and by designing parts to take stresses over and above those for which they are primarily designed, a very light but strong construction is produced. Hence, doors may be provided at selected locations, and instead of being obliged to add heavy parts to the body to strengthen it in the region of the doors, as commonly required, the wing structure is so designed and disposed as to take the required stresses.

The construction is convenient to build in subassemblies and easy to assemble into larger units and finally into the complete unit. Also good access is provided for later installing auxiliary equipment.

While one embodiment of the invention has been specifically illustrated and described, it is to be understood that the invention may have various embodiments within the limits of the prior art and the scope of the subjoined claims.

What is claimed is:

1. An aircraft comprising a body and an airfoil each including a frame and skin covering, means connecting the frame of the airfoil to the frame of the body, means connecting the skin covering of the airfoil to the skin covering of the body, and means, other than the frame-to-frame and the covering-to-covering connecting means, connecting the skin covering of the airfoil to the frame of the body.

2. An aircraft comprising a body and an airfoil each including a frame and skin covering, the skin covering of the airfoil including a skin sheet and reinforcing stringers therefor, means connecting the frame of the airfoil to the frame of the body, means connecting the stringers of the airfoil to the frame of the body, and means connecting the skin sheet of the airfoil to the skin covering of the body.

3. An aircraft comprising a body and an airfoil each including a frame and a skin covering, the airfoil in a central section thereof including spaced spars and the skin covering of the central section of the airfoil including a skin sheet and reinforcing stringers therefor, means connecting the frame of the airfoil to the frame of the body, means connecting said airfoil stringers to the frame of the body, and means connecting the skin covering of the airfoil to the skin covering of the body.

4. An aircraft comprising a body and an airfoil each including a frame and a skin covering, the body frame at the airfoil including a plurality of transverse girdles, the airfoil frame including a plurality of spaced spars, and the airfoil skin covering including reinforcing stringers, means connecting said spars to certain of said girdles, and means connecting said stringers to others of said girdles.

5. An aircraft comprising a body and wings each including a frame and a skin covering, the body frame at the wing location including a girdle formed of side bulkheads and transverse girders connecting the ends of the bulkheads to form an interior cargo space, the girdle bulkheads each being triangular in transverse section with a generally horizontal base of a triangle aligned with one of said girders, and said wings being secured to the bulkheads adjacent the bases, the inner side of the triangular bulkhead defining the side of the cargo space, and the outer side of the bulkhead defining the outer streamline contour of the aircraft body, the bulkheads within the wing root zone being provided with vertical stiffeners and in the zone outside the wing root zone being provided with horizontal stiffeners.

6. An aircraft comprising a body and wings each including a frame and a skin covering, the body frame at the wing location including a girdle formed of side bulkheads and transverse girders connecting the ends of the bulkheads to form an interior cargo space, the girdle bulkheads each being triangular in transverse section with a generally horizontal base of a triangle aligned with one of said girders, and said wings being secured to the bulkheads adjacent the bases, the bases of the triangular bulkheads being disposed at the top of the girdle, the inner side of the triangular bulkhead defining the side of the cargo space, and the outer side of the bulkhead defining the outer streamline contour of the aircraft body, the bulkheads within the wing root zone being provided with vertical stiffeners and in the zone outside the wing root zone being provided with horizontal stiffeners.

7. An aircraft comprising a body and wings each including a frame and a skin covering, the body frame at the wing location including a girdle formed of side bulkheads and transverse girders connecting the ends of the bulkheads to form an interior cargo space, the girdle bulkheads each being triangular in transverse section with a generally horizontal base of a triangle aligned with one of said girders, and said wings being secured to the bulkheads adjacent the bases, the bases of the bulkheads being disposed at the top of the girdle, the inner side of the triangular bulkhead being substantially vertical and defining the side of the cargo space, and the outer side of the bulkhead being inclined inward from top to bottom and defining the outer streamline contour of the aircraft body, the bulkheads within the wing root zone being provided with vertical stiffeners and in the zone outside the wing root zone being provided with horizontal stiffeners.

8. An aircraft comprising a body and wings each including a frame and a skin covering, the body frame at the wing location including a girdle formed of side bulkheads and transverse girders connecting the ends of the bulkheads to form an interior cargo space, the girdle bulkheads each being triangular in transverse section with a generally horizontal base of a triangle aligned with one of said girders, and said wings being secured to the bulkheads adjacent the bases, said wings each including vertically spaced skin coverings, one of which extends across the base of the triangular bulkhead and one of which stops against the outer side of the bulkhead, the inner side of the triangular bulkhead defining the side of the cargo space, and the outer side of the bulkhead defining the outer streamline contour of the aircraft body, the bulkheads within the wing root zone being provided with vertical stiffeners and in the zone outside the wing root zone being provided with horizontal stiffeners.

9. An aircraft comprising a body and wings each including a frame and a skin covering, the body frame at the wing location including a girdle formed of side bulkheads and transverse girders connecting the ends of the bulkheads to form an interior cargo space, the girdle bulkheads each being triangular in transverse section with a generally horizontal base of a triangle aligned with one of said girders, and said wings being secured to the bulkheads adjacent the bases, said wings each including vertically spaced shear elements disposed alongside a bulkhead and means securing said elements in shear to the bulkhead, the inner side of the triangular bulkhead defining the side of the cargo space, and the outer side of the bulkhead defining the outer streamline contour of the aircraft body, the bulkheads within the wing root zone being provided with vertical stiffeners and in the zone outside the wing root zone being provided with horizontal stiffeners.

10. An aircraft comprising a body and wings each including a frame and a skin covering, the body frame at the wing location including a girdle formed of side bulkheads and transverse girders connecting the ends of the bulkheads to form an interior cargo space, the girdle bulkheads each being triangular in transverse section with a generally horizontal base of a triangle aligned with one of said girders, and said wings being secured to the bulkheads adjacent the bases, said wings including vertically spaced splice members secured by shear means to the bulkhead, one of said splice members extending entirely across the base of the bulkhead and being secured to one of the girders of the body girdle.

11. An aircraft comprising a body and wings each including a frame and a skin covering, the body frame at the wing location including a girdle formed of side bulkheads and transverse girders connecting the ends of the bulkheads to form an interior cargo space, the girdle bulkheads each being triangular in transverse section with a generally horizontal base of a triangle aligned with one of said girders, and said wings being secured to the bulkheads adjacent the bases, the bulkhead in the base region to which the wing is connected including a sheet strengthened by spaced vertical stiffener struts and in the region outside the wing connection including a sheet strengthened by spaced horizontal stiffener struts.

12. An aircraft comprising a body and wings each including a frame and a skin covering, the body frame including a plurality of transverse girdles each having a bulkhead on the side, the wing frame including horizontally spaced spars each having cap strips connected to a bulkhead by shear elements extending across the bulkhead and a web connected by a shear splice plate to the edge of the bulkhead, and the wing skin covering including stringers connected to a bulkhead by shear elements extending across a bulkhead.

MICHAEL WATTER.
ALBERT G. DEAN.

REFERENCES CITED

The following references are of record in the file of this patent:

UNITED STATES PATENTS

| Number    | Name       | Date          |
|-----------|------------|---------------|
| 1,516,295 | Huntington | Nov. 18, 1924 |
| 1,840,901 | Hicks      | Jan. 12, 1932 |
| 2,228,253 | Berliner   | Jan. 14, 1941 |
| 1,865,964 | Rohrbach   | July 5, 1932  |
| 1,797,657 | Hall       | Mar. 24, 1931 |
| 1,875,651 | Phelan     | Sept. 6, 1932 |
| 1,785,318 | Lambert    | Dec. 16, 1930 |
| 1,780,812 | Burnelli   | Nov. 4, 1930  |